United States Patent [19]

Burrows

[11] Patent Number: 4,743,366
[45] Date of Patent: * May 10, 1988

[54] CONTROL VALVE ASSEMBLY FOR PURIFIED WATER SUPPLY SYSTEM

[76] Inventor: Bruce D. Burrows, 25,145 W. Ave. Stanford, Valencia, Calif. 91355

[*] Notice: The portion of the term of this patent subsequent to Jun. 17, 2003 has been disclaimed.

[21] Appl. No.: 848,351

[22] Filed: Apr. 4, 1986

Related U.S. Application Data

[63] Continuation of Ser. No. 545,880, Jul. 23, 1984, Pat. No. 4,595,497.

[51] Int. Cl.$^4$ .............................................. B01D 13/00
[52] U.S. Cl. .................. 210/110; 210/195.2; 210/257.2; 210/321.6; 210/321.72
[58] Field of Search ...................... 210/110, 129, 195.2, 210/257.2, 321.1, 433.2

[56] References Cited

U.S. PATENT DOCUMENTS

| | | | |
|---|---|---|---|
| 3,719,593 | 3/1973 | Astil | 210/135 |
| 3,831,757 | 8/1974 | Gossett et al. | 210/321.1 X |
| 3,887,463 | 6/1975 | Bray | 210/110 |
| 3,963,612 | 6/1976 | Gossett et al. | 210/321.1 X |
| 4,086,166 | 4/1978 | Martin | 210/134 |
| 4,210,533 | 7/1980 | Astil | 210/136 |
| 4,595,497 | 6/1984 | Burrows | 210/257.2 X |
| 4,604,194 | 8/1986 | Entingh | 210/98 |

Primary Examiner—Richard V. Fisher
Assistant Examiner—Richard D. Jordan
Attorney, Agent, or Firm—Kelly, Bauersfeld & Lowry

[57] ABSTRACT

A control valve assembly for use in a reverse osmosis system in which a tank and a pliable barrier are used to define a reservoir having separate confined spaces for purified water and reject water. The barrier when not deformed occupies only a portion of the interior of the tank, and requires a minimum of material to define. The uppermost part of the tank supports a single valve that has a pressurized feed water inlet and outlet, and a movable portion that extends into the interior of the upper interior portion of the tank. Upward movement of the movable portion throttles the rate of flow of pressurized feed water between the inlet and outlet. The barrier in addition of sub-dividing the interior of the reservoir into separate confined spaces of variable volume also serves to physically contact the movable portion and move it upwardly as the first confined space moves towards a last stage in approaching a filled condition to throttle the flow of pressurized feed water through the valve.

7 Claims, 3 Drawing Sheets

CONTROL VALVE ASSEMBLY FOR PURIFIED WATER SUPPLY SYSTEM

CROSS REFERENCE TO RELATED APPLICATIONS

The present application is a continuation of application Ser. No. 545,880 filed July 23, 1984, now U.S. Pat. No. 4,595,497, issued June 17, 1986, which was a substitute of application Ser. No. 330,186 filed Dec. 14, 1981, now abandoned, which in turn was a continuation-in-part of application Ser. No. 219,331 filed Dec. 22, 1980, now abandoned, which was a continuation of application Ser. No. 087,881 filed Oct. 24, 1979, now abandoned, which was a continuation of application Ser. No. 004,652, filed Jan. 19, 1979, now abandoned, which was a continuation of application Ser. No. 867,363 filed Jan. 6, 1978, and now abandoned.

BACKGROUND OF THE INVENTION

In the past, it has been common practice to utilize a purified water reservoir that contains a confined space filled with air, with air in the confined space being compressed as purified water discharges into the reservoir. The compressed air serves as the motive force to discharge purified water from the reservoir when purified water is required. This type of reservoir has the operational disadvantage that as the reservoir fills with purified water, an increasing back pressure is placed on purified water discharging from the reverse osmosis cartridge, and as a result cannot be used efficiently in areas where the feed water to be purified is supplied at a relatively low pressure. This type of reservoir even in areas where the feed water is at a substantial pressure does not operate efficiently due to the back pressure exerted by the compressed air on purified water discharging from the reverse osmosis cartridge, and the efficiency decreasing as the reservoir fills with purified water.

In another form of prior art reservoir, the purified water reservoir is an elongate fiber wound vessel that has the interior divided by a pliable barrier into first and second longitudinal compartments of variable volume, with one compartment containing purified water, and the other compartment capable of receiving pressurized feed water or reject water to discharge purified water from the reservoir. Certain prior art reverse osmosis systems that employ such reservoirs have the operational disadvantage that after the purified water has remained in the reservoir for a prolonged period of time, the purified water becomes contaminated due to osmosis occurring between the purified water and feed water in the reverse osmosis cartridge. Discharge of reject water or feed water to the reservoir in this type of assembly is controlled by complicated hydraulically operated means that are responsive to the pressure of the purified water. Fiber wound reservoirs are formed as an integral unit, and are not capable of being arranged to utilize the same pliable barrier when the overall volume of the reservoir is halved as is possible with Applicant's reservoir. Also, reservoirs of this type utilize a pliable barrier that is of substantially the same length as the interior of the reservoir, in contrast to Applicant's barrier that is only one half the length for a reservoir of the same volume. In other forms of prior art reverse osmosis assemblies of the above described type, excess purified water is discharged from the reservoir to a drain after the reservoir has been filled.

A major object of the present invention is to provide an inexpensive purified water reservoir of simple design, one that may be easily disassembled to permit the interior thereof to be cleaned, preferably utilizes major components that may be injection molded from a suitable commercially available polymerized resin, employs a pliable barrier to subdivide the interior of the reservoir into first and second confined spaces of variable volume into and out of which purified water and reject or feed water may flow through passages in the reservoir, and on that substantially eliminates the possibility of leakage due to flanges on the major components including the pliable barrier being gripped with a desired force by a circumferentially extending clamp that may be manually tensioned to a desired degree.

Another object of the invention is to supply a purified water reservoir in which the major components are a pair of cup shaped bodies that have first circular flanges that extend outwardly therefrom in abutting contact with a second circular flange that extends outwardly from the pliable barrier that is cup shaped, with the first pair of flanges and the second flange situated therebetween being gripped by a circular flange to provide a reservoir of a desired first interior volume, and this volume being reduced to substantially one half while using the same barrier by substituting a circular closure plate for one of the cup shaped bodies.

Yet another object of the invention is to supply a reservoir that not only serves to store purified water in a reverse osmosis system, but also provides a mounting for a valve assembly that is responsive to the movement of the barrier by physical contact, therewith with the valve assembly serving to reduce the rate of flow of feed water to the reverse osmosis cartridge as the reservoir approaches a filled condition with purified water, and as a result a substantial saving being achieved in the volume of feed water consumed over a period of time relative to prior art reverse osmosis devices is achieved.

A still further object of the invention is to furnish a purified water reservoir that permits a reverse osmosis cartridge to operate at optimum efficiency as the only back pressure to which purified water discharging from the cartridge is that due to the weight of feed water or reject water in the second confined space above the first confined space, and this weight decreasing as the first confined space fills with purified water.

SUMMARY OF THE INVENTION

The purified water reservoir assembly is used in conjunction with a reverse osmosis apparatus that includes a reverse osmosis cartridge that is in communication with a source of pressurized feed water and a manually operated faucet that controls the flow of pure water and reject water when manually moved from a first to a second position.

The purified water reservoir of the present invention preferably includes a pair of identical cup shaped bodies having end pieces and side pieces, with first flanges extending outwardly from the free circumferential edges of the side pieces, and the reservoir being so illustrated in the drawings. However, it is not essential that the cup shaped bodies be identical in structure. The cup shaped bodies are vertically disposed, with the uppermost cup shaped body in an inverted position. The pair of first flanges have recesses formed in the adjacent surfaces thereof.

A pliable barrier is provided that has a second flange that defines a circular bead that is removably disposed in the pair of grooves, and the second flange having a cup shaped member extending therefrom that is disposed in the uppermost one of the cup shaped bodies when the pliable barrier is not deformed. A circumferentially extending clamp of generally U-shaped transverse cross section removably engages the first pair of flanges and by manually operated tightening means provided on the clamp it may be tensioned. As the clamp is tensioned the outer portions of the first pair of flanges are drawn towards one another to force the first pair of recessed flanges into pressure sealing contact with the bead on the second flange. The cup shaped barrier serves in cooperation with the pair of cup shaped bodies to define first and second confined spaces of variable volume. An opening is formed in the lower one of the cup shaped bodies that has a fitting mounted therein to permit purified water to discharge into and out of the first confined space. The uppermost one of the cup shaped bodies preferably has an opening formed in the end piece thereof, with this opening having a valve assembly mounted thereabove and sealingly secured to the end piece, which valve assembly is in communication with a source of pressurized feed water. The valve assembly includes an outlet that is in communication with the inlet of the reverse osmosis cartridge.

The valve assembly includes a vertically movable valve member that extends downwardly into the second confined space of the purified water reservoir, and the valve member supporting a circular plate that is of substantially greater area than the portion of the valve member contacted by the pressurized water from the source thereof. The valve assembly when the valve member is in a first position obstructs communication between the feed water inlet and feed outlet of the valve assembly, and when in a second position establishes communication between the feed water inlet and feed water outlet. As the valve member moves from the second towards the first position, the valve member serves to throttle the rate of flow from the feed water inlet of the valve assembly to the feed water outlet. The first confined space as it fills with purified water moves the barrier upwardly, and prior to the first confined space reaching the filled position, the barrier physically contacts the plate. Due to the differential in area of the plate to the upper end of the valve member that is in communication with the pressurized feed water, the valve member is moved upwardly from the second towards the first position even though the pressure of purified water in the reservoir is far less than that of the feed water. As the valve member so moves upwardly due to contact of the barrier with the plate, the rate of flow of pressurized feed water to the reverse osmosis cartridge is throttled. When this condition is reached, the pressurized feed water flows to the reverse osmosis cartridge at a greatly reduced rate relative to the rate it flows when the valve is in the second position. Due to the operation of the valve assembly as above described, a minimum of feed water is wasted after the purified water substantially fills the first confined space.

DESCRIPTION OF THE PREFERRED EMBODIMENTS

Figure 1:
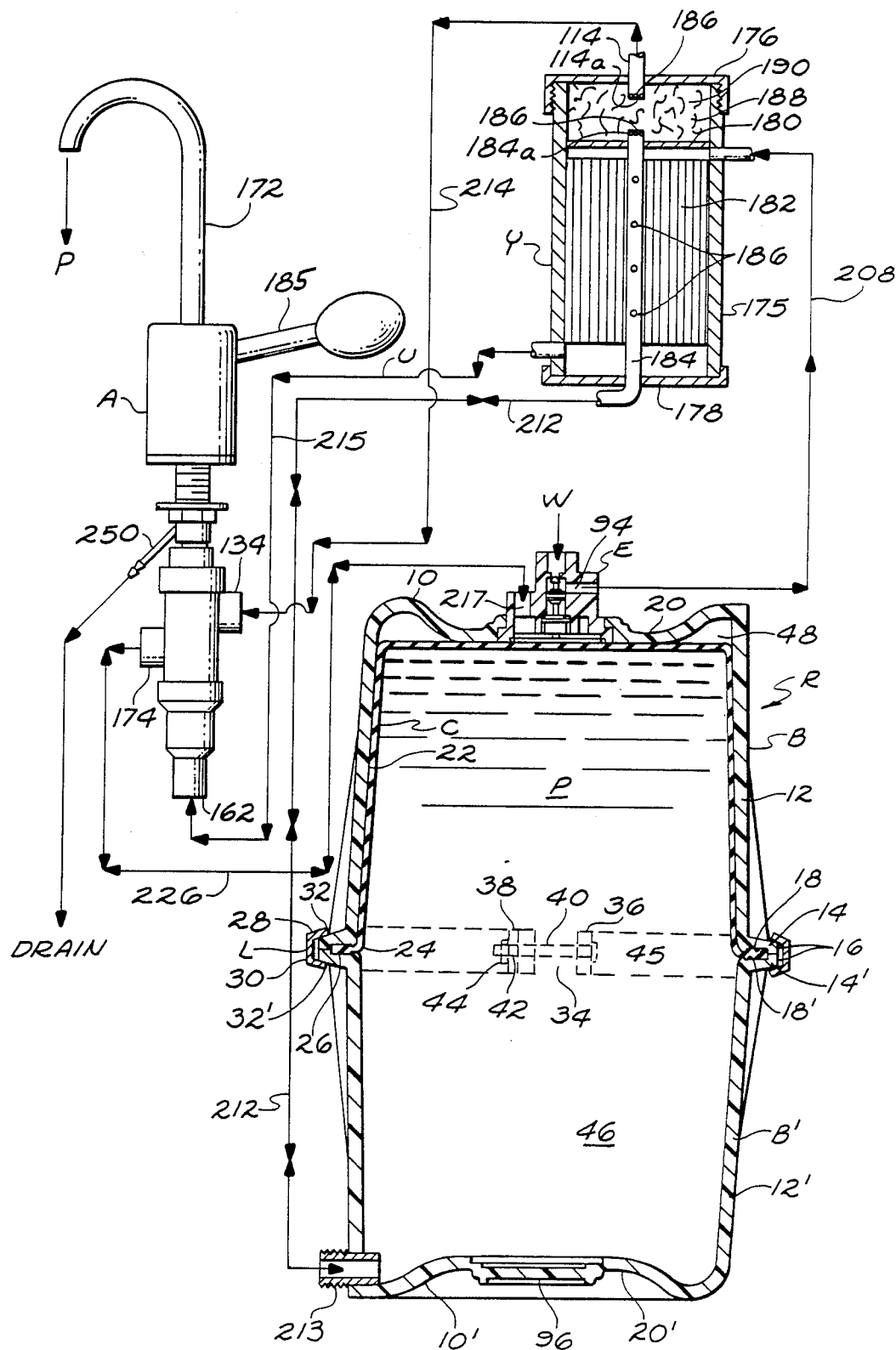
FIG. 1 is a longitudinal cross sectional view of the purified water reservoir showing a throttling valve assembly supported on the upper portion thereof, and diagrammatically indicating the communication between the valve assembly, the source of pressurized feed water, the reverse osmosis cartridge, and also indicating the flow of purified water from the cartridge as well as reject water, both to the manually actuated valve assembly and to the reservoir.

The purified water reservoir R of the present invention as may best be seen in FIG. 1 is formed from two vertically disposed cup shaped bodies B and B' that preferably are of identical structure. Each of the cup shaped bodies B and B' is preferably formed from a rigid polymerized resin, and due to being of identical structure may be injection molded using the same mold.

Each of the cup shaped bodies B and B' being of identical structure will have identical components, and only the cup shaped member B will be described in detail, with the numbers used in conjunction with this description being also used on the cup shaped member B', but with primes added thereto. The cup shaped member B includes an end piece 10 that has a generally cylindrical side wall 12 extending outwardly from the circumferential edge thereof, and the side wall terminating in an outwardly extending circular first flange 14. The first flange 14 has an external flat surface 16 in which a circumferentially extending groove 18 is defined. The end piece 10 has a recessed center portion 20 as shown in FIG. 1.

A pliable barrier C is provided that includes a cup shaped portion 22 that when not deformed substantially fills the interior of the cup shaped member B as shown in FIG. 1. This portion of the barrier C is identified by the numeral 22, and has a second flange 24 extending outwardly from the free circumferential edge thereof, and the second flange having a bead 26 extending outwardly from the opposite sides thereof. The bead 26 is disposed in the grooves 18 and 18' when the first flanges 14 and 14' are adjacently disposed. When the first flanges 14 and 14' are so disposed, the cup shaped member B will occupy an inverted position directly above the cup shaped member B' as shown in FIG. 1.

A clamp L is provided as shown in FIG. 1 which includes a circumferentially extending strip 28 that has a web 30 from which two oppositely angled arms 32 and 32' extend outwardly. The web 30 has the free ends thereof separated by a space 34 as shown in FIG. 1. The free ends of the web 30 have lugs 36 and 38 extending outwardly therefrom that have aligned openings therein. The lug 36 has a screw 40 that extends longitudinally therethrough towards the lug 38 to pass through an opening 42 therein, and the screw being engaged by a nut 44. Head 45 of screw 40 abuts against lug 36. By rotating screw 40 relative to the nut 44, the clamp L is tensioned circumferentially, with the arms 32 moving inwardly relative to the pair of first flanges 14 and 14' to force the outer portions of the flanges towards one another and cause the flanges to sealingly engage the bead 26 that is situated within the grooves 18 and 18'. The barrier C cooperates with the cup shaped members B and B' to define a first confined space 46 and second confined space 48. The cup shaped members B and B' each have raised center portions 96 that may be cut therefrom if desired. In FIG. 1 it will be noted that the lower cup shaped body B' has the raised portion 96 remaining therein, while it has been removed in the upper cup shaped member B and replaced by a valve assembly E that is bonded to the end piece 20 by conventional means.

Figure 2:
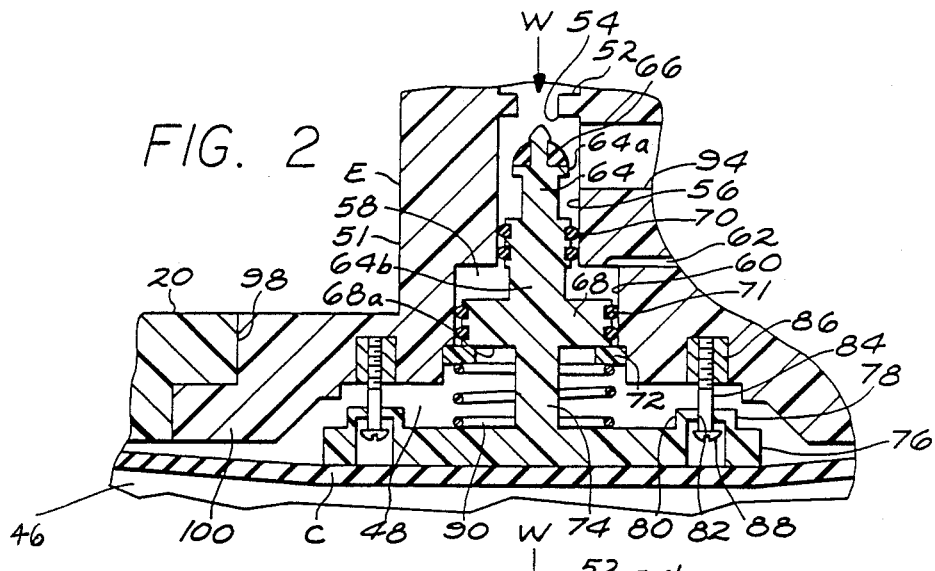
FIG. 2 is an enlarged fragmentary vertical cross sectional view of a portion of a first assembly that is moved from a second open position towards a closed first position by physical pressure contact with a pliable barrier as a first confined space expands towards a substantially filled position with purified water, and the first valve assembly including means to move it to the first position if the pressure of reject water or feed water in the second confined space rises above a predetermined magnitude.

The first form of valve assembly E is shown in FIG. 1 and in greater detail in FIG. 2 includes a body 51 that has a vertically extending pressurized feed water inlet 52 that terminates on the lower end in a ring shaped valve seat 54. A first bore 56 extends downwardly in the body 51 from the seat 54 and terminates in a body shoulder 58 from which a second vertical bore 60 aligned with but of greater diameter than the first bore 56 extends downwardly.

The first valve assembly E includes an elongate valve member 64 that has an upwardly disposed first portion 64a that has a resilient member 66 mounted on the upper end thereof, which resilient member may sealingly engage the seat 54 when the valve member 64 is in a first position. Valve member 64 includes a second portion 64b disposed below the first portion 64a but of larger diameter, which second portion supports a number of resilient sealing rings 70 that are in slidable sealing contact with the first bore 56.

The second valve member portion 64b develops into a piston 68 that supports a number of circumferentially extending sealing rings 71 that slidably and sealingly engage the second bore 60. A ring shaped stop 72 is mounted in the valve body 51 as shown in FIG. 2 and limits the downward movement of the piston 68. The valve member includes a third portion 74 that extends downwardly from the piston 68 and on the lower end supports a circular plate 76 of substantially greater diameter than the portion of the resilient member 66 that is exposed to pressurized feed water W when in engagement with valve seat 54. The plate 76 as seen in FIG. 2 includes a number of circumferentially spaced, upwardly extending, inverted cup shape members 78 that have upper ends 80 in which centered openings 82 are formed. The portion of second bore 60 above piston 68 has the air pressure therein equalized with that of the ambient atmosphere due to an air vent passage 62 shown in FIG. 2.

A number of screws 84 extend upwardly and slidably through the opening 82 to engage tapped metal inserts 86 supported in the valve body 51 as shown in FIG. 2. The screws 84 have the heads 88 thereof disposed within the inverted cup shaped member 78, and the plate 76 may move upwardly and downwardly relative to the screws 84. A helical spring 90 encircles the third portion 74 of the valve member 64 and at all times is in abutting contact with the stop 72 and the upper surface of the plate 76. A vent passage 62 is formed in the valve body 51 and communicates with the upper portion of the second bore 60 as shown in FIG. 2 to at all times maintain the air pressure in the second bore 60 above the piston 68 at substantially the same pressure as that of the ambient atmosphere. The vent opening 62 also serves to permit any water that may have been drawn upwardly above the piston 68 to be ejected through the vent 62 when the piston 68 moves upwardly to a position adjacent the body shoulder 58. In FIG. 2 is would be seen that the valve body 51 includes a feed water discharge passage 94 that communicates with the first bore 56 below the valve seat 54.

When pressure of reject water U in the second confined space 48 rises above a predetermined magnitude, the pressure exerts an upward force on the lower surface 68a of the piston 68 that is sufficient to overcome the compression of the spring 90 and also overcome the downward force exerted by the pressurized feed water W on the resilient member 66 and the upper surface of the second valve member portion 64b. This excess and undesired pressure of the reject water results in the valve member 64 being moved upwardly within the valve body 51 for the resilient member 66 to assume a first position where it sealingly engages valve seat 54 and prevents further flow of reject water U to the second confined space 48. This concept is of importance when the pair of cup shaped members 12 and 12' are formed from a polymerized resin, and it is not desired to subject the latter to greater than a predetermined internal pressure when the cup shaped bodies B and B' are assembled to define the reservoir assembly R as shown in FIG. 1.

The recessed center portions 20 of end pieces 10 have center areas 96 that may be cut therefrom to define stepped circular openings 98 in which the base 100 of the valve body 51 may be sealingly supported by conventional bonding means as shown in FIG. 2.

Although the purified water reservoir assembly may be used with various forms of reverse osmosis assemblies as will later be explained, it is preferable to use it with a reverse osmosis cartridge Y as shown in FIG. 1, and a manually operated purified water and reject water control device A that is described and claimed in my co-pending patent application Ser. No. 573,155 filed May 1, 1984 entitled "COMBINED PURIFIED WATER DISPENSING DEVICE AND REJECT WATER CONTROL DEVICE", now U.S. Pat. No. 4,585,554, issued Apr. 29, 1986.

The reverse osmosis cartridge Y as may be seen in FIG. 1 includes a cylindrical shell 175 that has an upper end piece 176 and lower end piece 178. The shell 175 has a partition 180 in the upper interior portion thereof that cooperates with the shell and upper end piece 176 to define a confined space 188 that is filled with activated carbon 190 that removes gases such as chlorine and the like from the purified water. The interior of the cylindrical shell 175 below the partition 180 has a reverse osmosis membrane 182 therein that extends around a tube 184 in which longitudinally spaced perforations 186 are defined. The tube 184 extends upwardly above the partition 180 into the confind space 188 to terminate in an end piece 184a. Perforations 186 are formed in the tube 184 that extends above the partition 180 into the confined space 188. The end piece 176 has an upper purified water discharge tube 114 projecting downwardly into the confined pace 188, with the upper tube 114 terminating on the lower end in an end cap 114a. The portion of the tube 114 within the compartment 188 has perforations 186 therein.

The discharge of purified water P from the first confined space 46 and the flow of reject water U to the drain or to the second confined space 48 is preferably controlled by the purified water dispenser A shown in FIG. 1, which is described in detail in my co-pending application Ser. No. 573,155 filed May 1, 1984, now U.S. Pat. No. 4,585,554.

When the pressure on the feed water W has moved the valve E to the second position shown in FIG. 2, the feed water which is under pressure and may contain chlorine flows through the discharge 94 in valve E to a conduit 208 that is in communication with the interior of cartridge Y above membrane 182 and below partition 180 to be subdivided into purified water P and reject water U. The purified water P may enter openings 186 in tube 184 to flow through a conduit 212 to enter a fitting 213 that is affixed to the lower cup shaped body B' as shown in FIG. 1, and communicates with the first confined space 46. Purified water P after entering openings 186 in tube 184 may flow upwardly in tube 184 to discharge through opening 184a and after flowing through activated carbon 190 in the space 188 enter openings 186 in a tube 114 that extends through top 176 to flow through conduit 214 to a purified water inlet in the purified water and reject water control unit A.

Reject water U flows through a conduit 215 to an inlet 162, and when the handle 185 of the purified water dispenser A is in an upper first position the reject water is directed through flow restrictors (not shown) in the dispenser A to flow through a discharge conduit 250 to the drain. The dispenser A includes an inverted J shaped tubular member 172 through which purified water P discharges when the handle 185 moves downwardly to a second position.

The purified water dispenser A includes a reject water passage that by a conduit 226 is in communication with a passage 217 in the top 10 of cup shaped body B that is at all times in communication with second confined space 48. When the handle 185 is in the upper first position a valve member (not shown) in the purified water dispenser A obstructs communication between conduit 214 and spout 172.

Upon the handle 185 being moved downwardly to a second position communication is established between conduit 214 and spout 172. Concurrently, one of the flow restrictors (not shown) in purified water dispenser A is by-passed and reject water U can flow at a rapid rate through conduit 215, purified water dispenser A, passage 174, conduit 226, to the passage 217 into second confined space 48. This rapid flow of reject water U in part takes place through membrane 182, and as a result foreign material is washed therefrom.

The flow of reject water U into second confined space 48 results in a downward force being exerted through the barrier C onto purified water P in first confined space 46. Purified water is accordingly forced from the first confined space 46 through conduit 212 into tube 174 to discharge through opening 186 above partition 180 to flow through activated carbon 188 to have any chlorine therein removed therefrom. The chlorine free purified water now flows through tube 114 and conduit 214 to inlet 134 and through purified water dispenser A to the spout 172 to discharge therefrom.

When the above described operation takes place the top portion of barrier C moves downwardly in reservoir R out of pressure contact with plate 76, and the force of feed water W on valve member 64 moves the valve member downwardly to permit an unobstructed flow of feed water from inlet 52 to outlet 94 and conduit 208.

When the first confined space 46 is substantially filled with purified water P and the top of barrier C is in contact with plate 76, the initial force exerted on purified water P in first confined space 46 when handle 185 is moved downwardly from a first to a second position will be the force transmitted to the barrier by the plate as the valve E moves from a first to a second position.

When the handle 185 of the purified water dispenser A is moved from the second to the first position, purified water ceases to discharge from spout 172, and the purified water P from reverse osmosis cartridge Y flows to the first confined space 46. The first confined space now starts to expand and the second confined space 48 to contract. The purified water P is pressurized in expanding confined space 46 to the extent that it exerts an upward force through barrier C on reject water U to force the reject water through conduit 226 to enter the purified water dispenser A through passage 174 and then discharge therefrom through drain line 250, all of which is described in detail in my co-pending application previously identified.

As the first confined space 46 approaches a filled condition the barrier C physically contacts plate 76 and moves valve member 64 towards the first position to throttle the flow of feed water W to the reverse osmosis cartridge Y. The valve member 64 approaches but does not reach the first position, and as a result there is a throttled flow of feed water W to the membrane 182 that is sufficient to maintain it in a moist condition.

Should the pressure of reject water U in the second confined space 48 exceed a predetermined pressure, a force will be exerted on the surface 68a of piston 68 sufficient to move the valve member 64 to a fully closed first position. Such a limitation on the internal pressure to which the reservoir R is subjected is of importance when the cup shaped bodies B and B' are injection molded from a polymerized resin. The piston 68 assures that the reservoir R will never be subjected to an internal pressure that would result in the rupture or breakage thereof.

Figure 3:
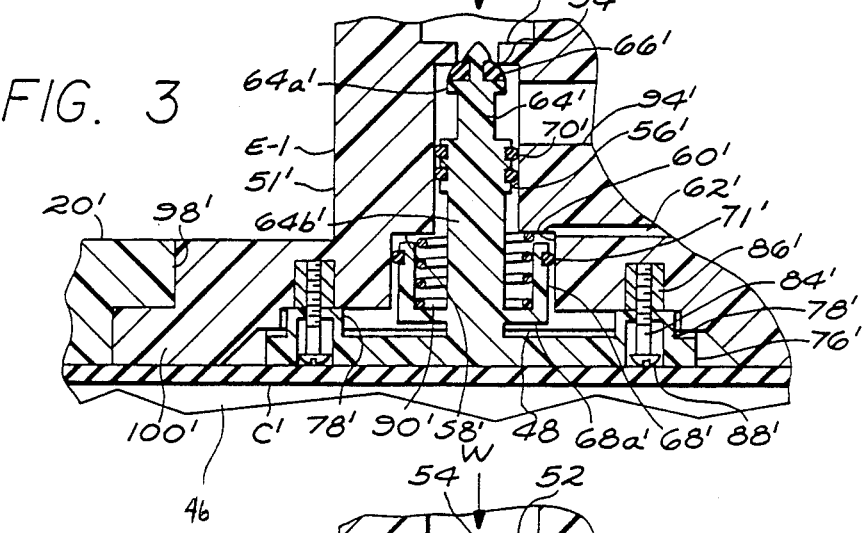
FIG. 3 is an enlarged fragmentary view of a second form of the valve assembly and illustrating a second structure for moving the valve member to the first position when the pressure on reject water within the reservoir exceeds a predetermined magnitude.
Figure 4:
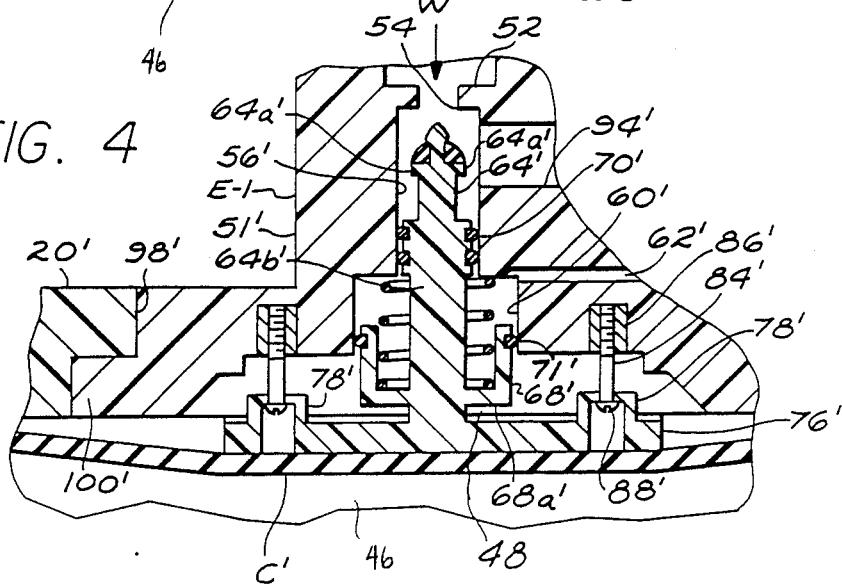
FIG. 4 is the same view as shown in FIG. 3, but with the valve member in a second position.

An alternate form E-1 of the valve is shown in FIGS. 3 and 4 and includes substantially all of the elements common to valve E. Elements in valve E-1 common to valve E are identified by the numerals previously used, but which are identified by primes being added thereto.

In valve E-1 which is shown in the first or closed position in FIG. 3 and the second position in FIG. 4, the stop 72 is eliminated, and the piston 68 replaced by a cup shaped body 68', that contains the spring 90' in abutting contact with the bottom thereof and the body shoulder 58'. The cup supports a resilient sealing ring 70' on the exterior thereof. When the pressure of reject water U in confined space 48 is of a predetermined magnitude, the force exerted on the bottom 68a' of the cup 68' is sufficient to move the valve member 64' to the first position shown in FIG. 3.

The reservoir R has been described previously for use with my purified water dispenser, but as may be seen diagrammatically in FIGS. 5 to 10 inclusive, it may be used with other reverse osmosis systems.

Figure 5:
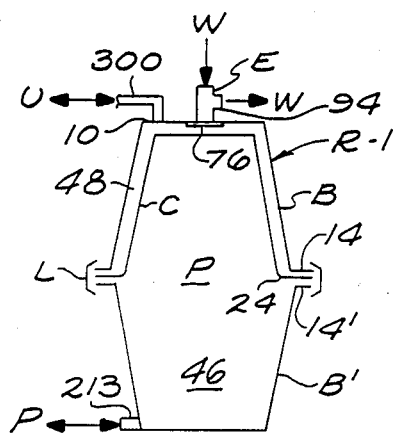
FIG. 5 is a diagrammatic view of the purified water reservoir that has a purified and reject water inlet and outlet that are separate and apart from the valve assembly that includes a pressurized feed water inlet and feed water outlet.

In FIG. 5 a reservoir R-1 will be seen that reject water U may flow into and out of the second confined space 48 through a separate conduit 300 that is in communication with second confined space 48.

Figure 6:
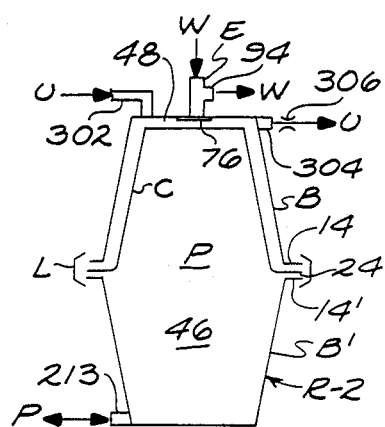
FIG. 6 is a second diagrammatic view of the purified water reservoir, with the reject water discharging into the second confined space flowing transversely thereacross to discharge through an outlet in the upper cup shaped body and then through a flow restrictor.

The reservoir R-2 is illustrated in FIG. 6 as having a conduit 302 through which reject water U flows to the second confined space 48 and exits therefrom through a conduit 304 that communicates with a flow restrictor 306.

Figure 7:
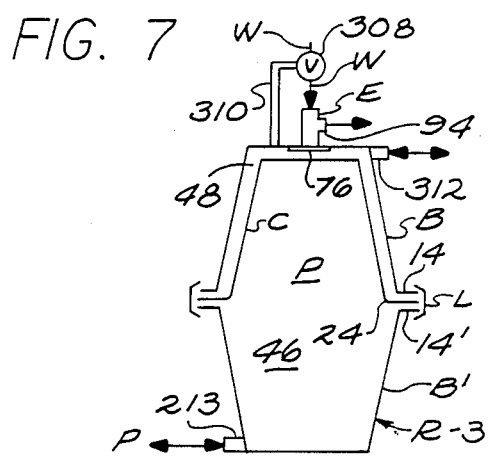
FIG. 7 is a third diagrammatic view of an arrangement in which the pressure of feed water is used to discharge purified water from the reservoir.

In FIG. 7 the reservoir R-3 a pressure sensitive valve 308 is shown upstream from valve E, which valve is normally open, but which closes when the pressure of reject water U rises above a predetermined magnitude. Valve 308 is connected to confined space 48 by a conduit 310. A reject water inlet and outlet 312 is in communication with second confined space 48 and a flow restrictor (not shown).

Figure 8:
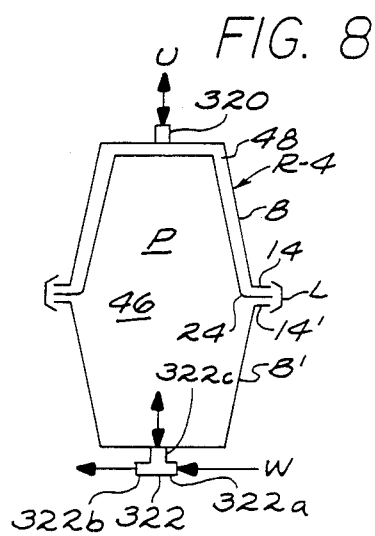
FIG. 8 is a fourth diagrammatic view of the use of a purified water reservoir in a reverse osmosis apparatus.

In FIG. 8 the reservoir R-4 is shown with a reject or feed water passage 320 that communicates with second confined space 48 and permits flow of reject or feed water W either into or out of the second confined space. A tubular tee 322 is shown in FIG. 8 that has first, second and third legs 322a, 322b and 322c. Purified water P flows through leg 322 and may enter first confined space 46 through third leg 322c or flow through leg 322b to a desired destination.

Figure 9:
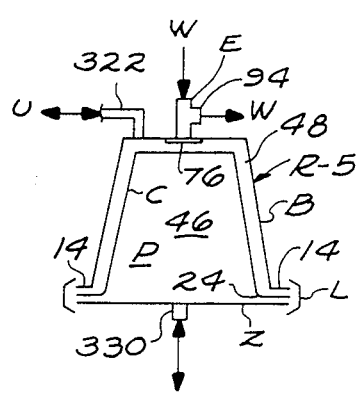
FIG. 9 is a fifth diagrammatic view of a purified water reservoir that is similar to that illustrated in FIG. 5, but with the reservoir being but half the capacity to that shown in FIG. 5.
Figure 10:
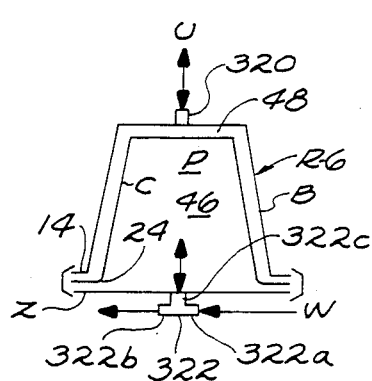
FIG. 10 is a sixth diagrammatic view of a purified water reservoir that is similar to that shown in FIG. 8, but with only half of the capacity of the reservoir illustrated in the last mentioned figure.

A reservoir R-5 is shown in FIG. 9 in which the lower cup shaped body B' is replaced by a closure plate Z that has the peripheral edge thereof, second flange 24 and first flange 14 sealing gripped by a circular clamp L. A tubular member 330 is supported from plate Z and is in communication with first confined space 46. Tubular member 330 permits purified water P to discharge into and out of first confined space 46. Reject water may flow into and out of second confined space 48 through a conduit 322. The reservoir R-5 permits the same barrier C to be used in the forms of the invention previously described, but with the volume of the reservoir R-5 being but substantially one half of reservoir R or R-1.

The reservoir R-6 is the same as reservoir R-4 but with the cup shaped body B' replaced by the closure plate Z.

The use and operation of the inventions have been described previously in detail and need not be repeated.

The invention claimed is:

1. A purified water supply system, for use in providing purified water from a supply of feed water under pressure, said system comprising:
a reservoir tank having a pliable barrier dividing the interior thereof into a reject water chamber and a purified water chamber, said reject water chamber being separated by said barrier from said purified water chamber;
a reverse osmosis unit for receiving and processing feed water to produce purified water and reject water;
a control valve mounted on said reservoir tank and including a valve body defining a feed water inlet for connection to the supply of feed water and a feed water outlet for connection of feed water to said reverse osmosis unit, and a valve member within said valve body for movement between first and second positions respectively preventing and permitting flow of feed water from said feed water inlet to said feed water outlet, said valve member including a first portion of relatively small cross sectional area exposed to the pressure of feed water at said feed water inlet and a pressure plate of substantially larger cross sectional area disposed within said reject water chamber in a position for contact by said barrier to displace said valve member toward said first position when said purified water chamber reaches a substantially full condition;
means for delivering purified water from said reverse osmosis unit to said purified water chamber; and
dispensing valve means movable between open and closed positions, said dispensing valve means in said open position including means for communicating said purified water chamber to a dispensing outlet for use and for communicating reject water from said reverse osmosis unit to said reject water chamber at a substantial flow rate, whereby the reject water within said reject water chamber acts through said barrier against the purified water within said purified water chamber to force the purified water therein to flow to said dispensing outlet,
said dispensing valve means in said closed position further including means for preventing communication between said purified water chamber and said dispensing outlet and for coupling said reject water chamber to a drain substantially without back pressure applied to said reject water chamber, whereby the pressure of the feed water acting against said first portion of said valve member normally maintains said valve member in said second position to permit flow of feed water to said reverse osmosis unit and resultant production of purified water supplied to said purified water chamber to fill said purified water chamber with minimum back pressure and simultaneous discharge of reject water from said reject water chamber until said purified water chamber reaches the substantially full condition and said barrier contacts said pressure plate of said valve member to displace said valve member toward said first position throttling the flow of feed water from said feed water inlet to said feed water outlet.

2. The purified water supply system of claim 1 wherein said dispensing valve means includes conduit means having flow restrictor means therein, said conduit means coupling reject water from said reverse osmosis unit to said drain with a predetermined back pressure when said dispensing valve means is in said closed position.

3. The purified water supply system of claim 2 wherein said conduit means further couples the reject water from said reverse osmosis unit to said reject water chamber with a back pressure substantially less than said predetermined back pressure when said dispensing valve means is in said open position.

4. The purified water supply system of claim 1 wherein said valve body defines a first bore communicating between said feed water inlet and said feed water outlet and defining a valve seat therebetween, said first portion of said valve member including means for sealing seated engagement with said valve seat.

5. The purified water supply system of claim 4 wherein said first portion and said pressure plate of said valve member are positioned generally at opposite ends of said valve member.

6. The purified water supply system of claim 1 wherein said control valve further includes means responsive to the pressure of reject water within said reject water chamber to displace said valve member toward said first position when said pressure within said reject water chamber reaches a predetermined threshold.

7. The purified water supply system of claim 1 wherein said barrier is spaced from contact with said pressure plate when said purified water chamber is filled to a level less than said substantially full condition.

* * * * *